US007520997B2

(12) United States Patent
Antoun (10) Patent No.: US 7,520,997 B2
(45) Date of Patent: Apr. 21, 2009

(54) SEPARATION DEVICES, SYSTEMS AND METHODS FOR SEPARATION OF PARTICULATES FROM LIQUID

(76) Inventor: Gregory S. Antoun, 14701 Middle Rd., Meadville, PA (US) 16335

( * ) Notice: Subject to any disclaimer, the term of this patent is extended or adjusted under 35 U.S.C. 154(b) by 331 days.

(21) Appl. No.: 10/933,565

(22) Filed: Sep. 4, 2004

(65) Prior Publication Data
US 2006/0049120 A1   Mar. 9, 2006

(51) Int. Cl.
C02F 1/38 (2006.01)
B04B 5/12 (2006.01)
B01D 21/26 (2006.01)

(52) U.S. Cl. .................. 210/788; 210/787; 210/800; 210/803; 210/806; 210/259; 210/294; 210/512.3; 210/520; 210/523; 210/532.1

(58) Field of Classification Search ............... 210/787, 210/788, 806, 294, 298, 299, 304, 512.1, 210/512.3, 800, 803, 259, 523, 532.1; 494/43, 494/50, 60
See application file for complete search history.

(56) References Cited

U.S. PATENT DOCUMENTS

| | | | |
|---|---|---|---|
| 2,701,642 A | 2/1955 | Goodwin | |
| 3,235,091 A | 2/1966 | Doll | |
| 3,271,929 A | 9/1966 | Bowden | |
| 3,341,983 A | 9/1967 | Baldenhofer | |
| 3,512,651 A | 5/1970 | Laval | |
| 3,770,130 A | 11/1973 | Brookins | |
| 3,784,009 A | 1/1974 | Maciula | |
| 3,997,447 A | 12/1976 | Breton | |
| 4,033,877 A | 7/1977 | Klepp | |
| 4,147,630 A | 4/1979 | Laval | |
| 4,294,695 A | 10/1981 | Smith | |
| 4,305,825 A | 12/1981 | Laval | |
| 4,312,751 A | 1/1982 | Casamitjana | |
| 4,364,831 A | 12/1982 | Burns | |
| 4,406,651 A | 9/1983 | Dudrey | |

(Continued)

FOREIGN PATENT DOCUMENTS

EP   0 026 530 B1   4/1981

(Continued)

*Primary Examiner*—David A Reifsnyder
(74) *Attorney, Agent, or Firm*—Bartony & Hare, LLP (57) ABSTRACT

A system for separating a heavy fraction from a liquid, including a housing and a mechanism in operative connection with the housing to induce rotational flow within an upper section of the housing. The system further includes a flow restrictor positioned below (that is, at the bottom of or below) the upper section of the housing in which rotational flow is induced by the rotational flow mechanism. The flow restrictor has a diameter less than the inner diameter of the housing so that a gap is formed between the flow restrictor and the housing. The housing further includes an inlet positioned above the flow restrictor and a first outlet positioned below the flow restrictor. The first outlet is positioned radially inward from an interior wall of the housing. The housing can be generally cylindrical from the top of the gap to a baffle positioned below the flow restrictor. The baffle defines a settling section for the heavier fraction. The housing further includes a second outlet in operative communication with the settling section. The system can further include a deflector positioned above the baffle and below the flow restrictor. The deflector has a diameter less than the diameter of the housing. The heavier fraction can, for example, include solid particles.

37 Claims, 4 Drawing Sheets

U.S. PATENT DOCUMENTS

| | | |
|---|---|---|
| 5,009,796 A | 4/1991 | Petrik |
| 5,229,014 A | 7/1993 | Collins |
| 5,254,076 A | 10/1993 | Chow |
| 5,330,641 A | 7/1994 | Cattani |
| 5,543,087 A | 8/1996 | Lee |
| 5,779,618 A | 7/1998 | Onodera |
| 5,848,862 A | 12/1998 | Antoun |
| 5,879,545 A | 3/1999 | Antoun |
| 5,893,973 A | 4/1999 | Antoun |
| 5,901,853 A | 5/1999 | Singleton |
| 5,951,216 A | 9/1999 | Antoun |
| 5,988,952 A | 11/1999 | Antoun |
| 6,036,871 A | 3/2000 | Eichler |
| 6,045,300 A | 4/2000 | Antoun |
| 6,090,286 A | 7/2000 | Cattani |
| 6,337,017 B1 * | 1/2002 | McCulloch .............. 210/512.1 |
| 6,406,635 B1 | 6/2002 | Smith |
| 6,533,509 B1 | 3/2003 | Antoun |
| 7,074,339 B1 * | 7/2006 | Mims ......................... 210/788 |
| 2004/0118774 A1 | 6/2004 | Davidiam |

FOREIGN PATENT DOCUMENTS

| | | |
|---|---|---|
| GB | 2 103 962 A | 4/1981 |
| JP | 59 232744 | 5/1985 |
| WO | WO 2005/030762 | 12/2005 |
| WO | WO 2006/028792 | 3/2006 |

* cited by examiner

SEPARATION DEVICES, SYSTEMS AND METHODS FOR SEPARATION OF PARTICULATES FROM LIQUID

BACKGROUND OF THE INVENTION

The present invention relates generally to separation devices, systems and methods for separation of materials based upon differences in densities and, especially, to separation devices, systems and methods for separation of solid particles from liquids.

In a number of situations arising in many settings, it is desirable to separate mixtures of materials of different density. For example, it is often desirable to remove particles from a liquid "contaminated" with such particles. For example, in the machining industry coolant liquid becomes contaminated with metal particles having a density generally greater than the liquid coolant.

Centrifugal force effects have been used to separate heavier fractions from lighter fractions in aqueous slurries. For example, U.S. Pat. No. 6,036,871 discloses a separation device in which a slurry is made to spin in a separation chamber under influence of a differential pressure. The differential pressure is generated using a pressure increasing stage including a transport rotor device operating in conjunction with a stator arrangement. The pressure increasing stage is in placed immediately upstream of an inlet of the slurry into the separation chamber. The separation chamber can include a cyclone rotor device. In one embodiment, the rotor blades of a cyclone rotor device and rotor blades of the transport rotor device are mounted on the same rotary shaft. The separating chamber of U.S. Pat. No. 6,036,871 includes a tubular cylindrical housing translating into a funnel-shaped bottom portion which tapers into a discharge opening at the lower end. The hollow rotary shaft protrudes coaxial to the longitudinal centerline of the separation chamber. The end or opening of the hollow rotary shaft is positioned at a distance suitably spaced away from the plane from which the funnel-shaped portion extends downwards. Heavier fractions are collected at an outlet at the bottom of the funnel shaped portion while lighter liquid fractions pass through an upper outlet in fluid connection with the opening of the hollow shaft.

U.S. Pat. No. 5,330,641 discloses a separator of solid particles for variable flow rates of discharge from a dental apparatus. The separator includes a container including an upper cylindrical zone having an inlet hole for the fluid to be separated. A rotor of a centrifugal pump rotates in the upper cylindrical zone, which initializes a separation of the particles by centrifugation. The separator further includes a trunco-conical zone which functions as a cyclone and continues the separation of the solid particles.

Mechanical elevators or augers have also been used to convey solid particles from a liquid as disclosed, for example, in U.S. Pat. Nos. 4,294,695 and 4,364,831.

Although a number of separation devices, systems and methods have been developed for separating materials based upon differences in densities (for example, separation of solid particles from liquids) in remains desirable to develop improved separation devices, systems and methods.

SUMMARY OF THE INVENTION

In one aspect, the present invention provides a system for separating a heavy fraction from a liquid, including a housing and a mechanism in operative connection with the housing to induce rotational flow within an upper section of the housing. The system further includes a flow restrictor positioned below (that is, at the bottom of or below) the upper section of the housing in which rotational flow is induced by the rotational flow mechanism. The flow restrictor has a diameter less than the inner diameter of the housing so that a gap is formed between the flow restrictor and the housing. The housing further includes an inlet positioned above the flow restrictor and a first outlet positioned below the flow restrictor. The first outlet is positioned radially inward from an interior wall of the housing. The housing can be generally cylindrical from the top of the gap to a baffle positioned below the flow restrictor. The baffle defines a settling section for the heavier fraction. The housing further includes a second outlet in operative communication with the settling section. The system can further include a deflector positioned above the baffle and below the flow restrictor. The deflector has a diameter less than the diameter of the housing. The heavier fraction can, for example, include solid particles.

The rotational flow mechanism can, for example, be an impeller including radially extending vanes in operative connection with a rotating shaft, wherein the shaft has a passage therethrough in fluid connection with the first outlet. In one embodiment, the flow restrictor is a plate positioned below and rotating with the vanes of the impeller. The baffle can, for example, include stationary vanes that extend radially outward generally to the inner diameter of the housing. The deflector can operate to prevent at least a portion of the heavier fraction in the settling area from passing from the settling section to the first outlet. Likewise, the deflector can operate to prevent at least a portion of liquid having a reduced concentration of heavy fraction from passing from a section of the housing radially inward from the interior wall of the housing downward into the settling section. In one embodiment, the deflector has a generally concave shape and is oriented so that the center of the concave deflector is downward from a concave surface of the concave deflector.

Preferably, there is no rotational flow mechanism to induce rotational flow in the housing below the flow restrictor.

The system can further comprising a settling tank. The settling tank includes an inlet through which a particle rich slurry exiting the second outlet of the housing is transported.

The settling tank can also include a settling tank outlet positioned below the settling tank inlet. The settling tank outlet is in fluid connection with a transport to transport a heavier fraction including, for example, particles removed from the settling tank via the settling tank outlet. In one embodiment, slurry from the housing is passed into the settling tank via the settling tank inlet thereby displacing liquid from the settling tank via the settling tank outlet. The transport can be operable to move particles upward to a collection point. The collection point can be above the level of liquid in the settling tank. In one embodiment, the transport includes an auger within an auger housing.

In another aspect, the present invention provides a system for separating a heavier fraction from a liquid, including a housing and a rotational flow mechanism in operative connection with a section of the housing to induce rotational flow within the housing. A flow restrictor is positioned below the section of the housing wherein rotational flow mechanism induces rotational flow. The flow restrictor has a diameter less than the inner diameter of the housing so that a gap is formed between the flow restrictor and the housing. The housing includes an inlet positioned above the flow restrictor and a first outlet positioned below flow restrictor. The first outlet is positioned radially inward from an interior wall of the housing. The system further includes at least one baffle positioned adjacent a bottom of the housing to reduce rotation in flow within the housing in the area of the baffle. The baffle defines at least the upper beginning of a settling section for the heavier fraction. The housing further includes a second outlet positioned adjacent the bottom of the housing in fluid communication with the settling section.

In still another aspect, the present invention provides a method of separating solid particles from a liquid; including: introducing liquid containing particles into a separation system, the separation system comprising a housing; inducing rotational flow of the liquid containing particles in an upper section of the housing; and forcing the liquid containing particles past a flow restrictor to a lower section of the housing. The flow restrictor has a diameter less than an interior wall of the housing so that a gap is formed between the flow restrictor and the interior wall of the housing through which the liquid containing particles must pass and so that the liquid containing particles moves around and downward along the interior wall of the housing, thereby forcing particles to move radially outward toward the interior wall of the housing as a result of centrifugal force.

The method can further include: positioning a deflector below the gap, the deflector being dimensioned to form a gap between the deflector and the interior wall of the housing; reducing rotation of the flow in a settling section positioned within the housing below the deflector; removing liquid having a reduced concentration of particles from a first outlet positioned radially inward from the interior wall of the housing and above the deflector; and removing liquid having an increased concentration of particles from a second outlet in operative connection with the settling section.

The method can further include: transporting outflow from the second outlet to a settling tank, the settling tank including an inlet through which outflow from the second outlet enters the settling tank; allowing the contents of the settling tank to settle for a period of time; and removing liquid having a reduced concentration of particles from a settling tank outlet positioned above the settling tank inlet. The settling tank outlet can be in fluid connection with a transport. In one embodiment, the outflow from the housing is passed into the settling tank via the settling tank inlet thereby displacing liquid from the settling tank via the settling tank outlet. The transport can be operable to move particles upward to a collection point, the collection point being above the level of liquid in the settling tank. The mechanical transport can, for example, include an auger within an auger housing.

BRIEF DESCRIPTION OF THE DRAWINGS

Other aspects of the invention and their advantages will be discerned from the following detailed description when read in connection with the accompanying drawings, in which.

DETAILED DESCRIPTION OF THE INVENTION

In the present invention, a separator system is described that takes advantage of centrifugal force to separate materials based upon differences in density. In a representative embodiment of the present invention, solid particles are removed from a liquid (for example, a coolant liquid used in machining operations) having a density less than the particles. The separation system includes no filtering media such as screens, meshes, etc. The separation systems of the present invention separate substantially particle-free liquid from a slurry including liquid with a high concentration of particles. In a second stage, the particles can be removed from the slurry by a "settling" separator system. The systems of the present invention are relatively simple to manufacture and to operate. The systems of the present invention are also more efficient when compared to currently available separation systems.

Figure 1:
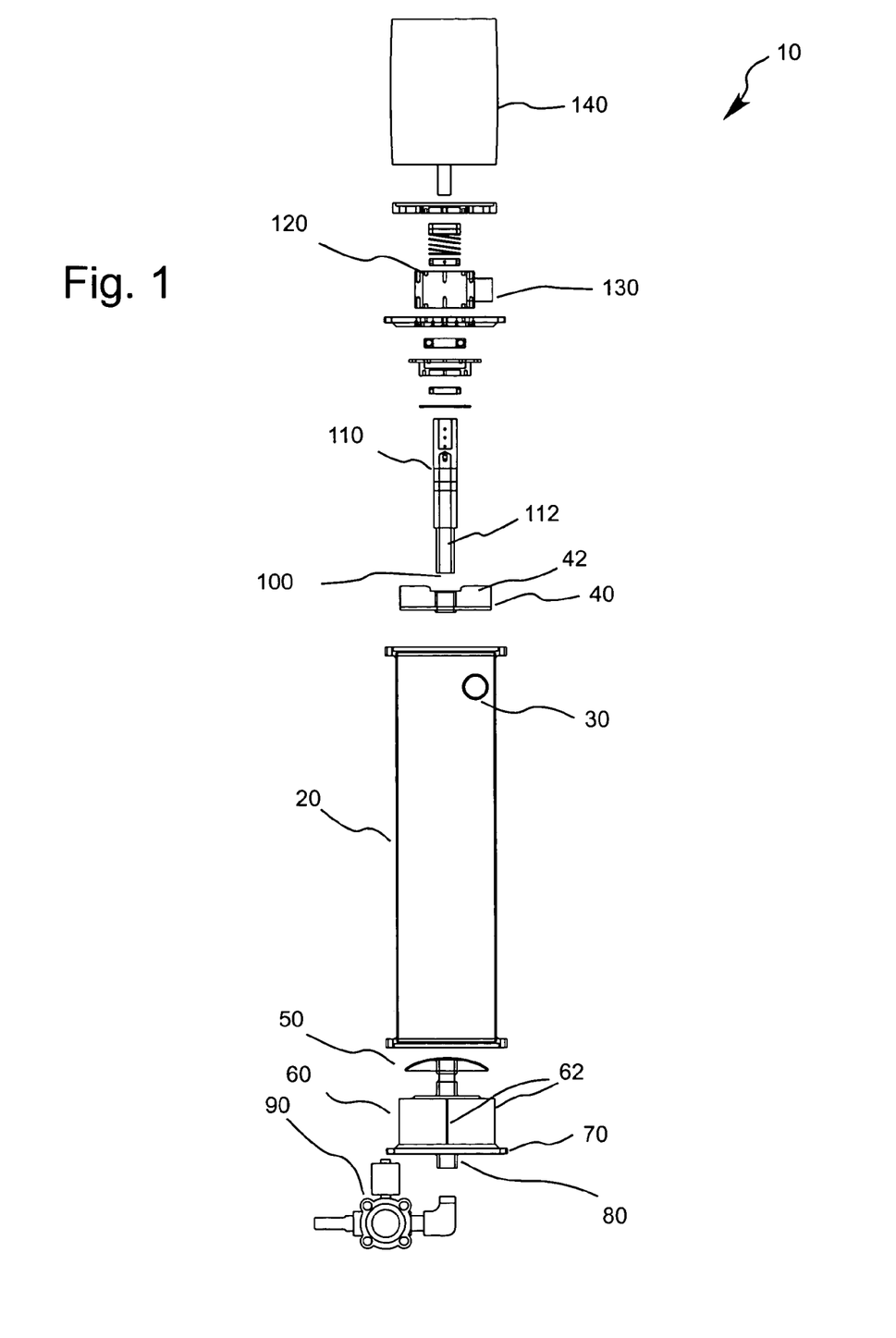
FIG. 1 illustrates a side view an embodiment of a separation device of the present invention in a disassembled or exploded view.
Figures 2A, 2B, 2C:
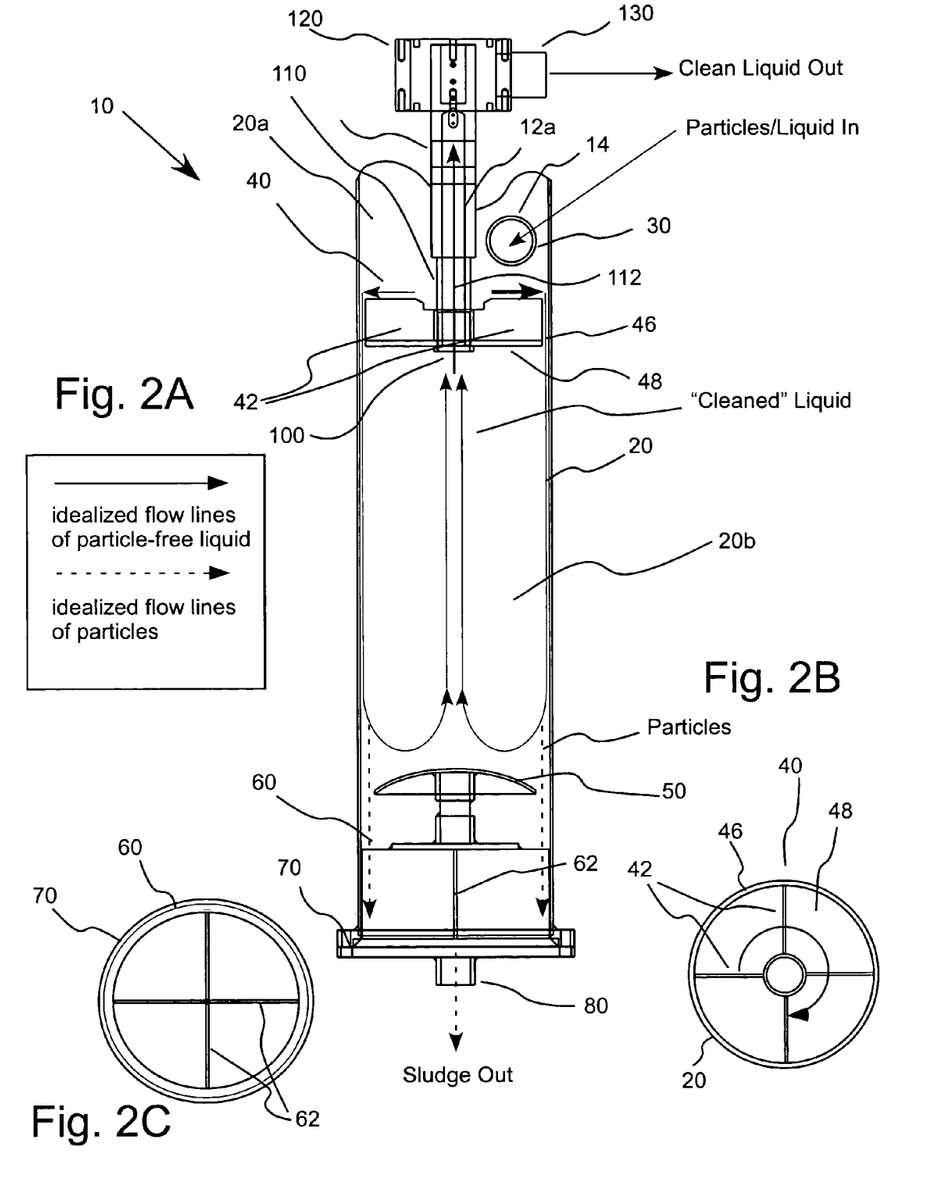
FIG. 2A illustrates a side, transparent or hidden line view of several of the components of the separation device of FIG. 1 in an assembled state.
FIG. 2B illustrates a top view of an embodiment of an impeller within the separation chamber of the separation system of FIG. 1.
FIG. 2C illustrates a top view of an embodiment of a baffle of the separation system of FIG. 1.
Figure 3:
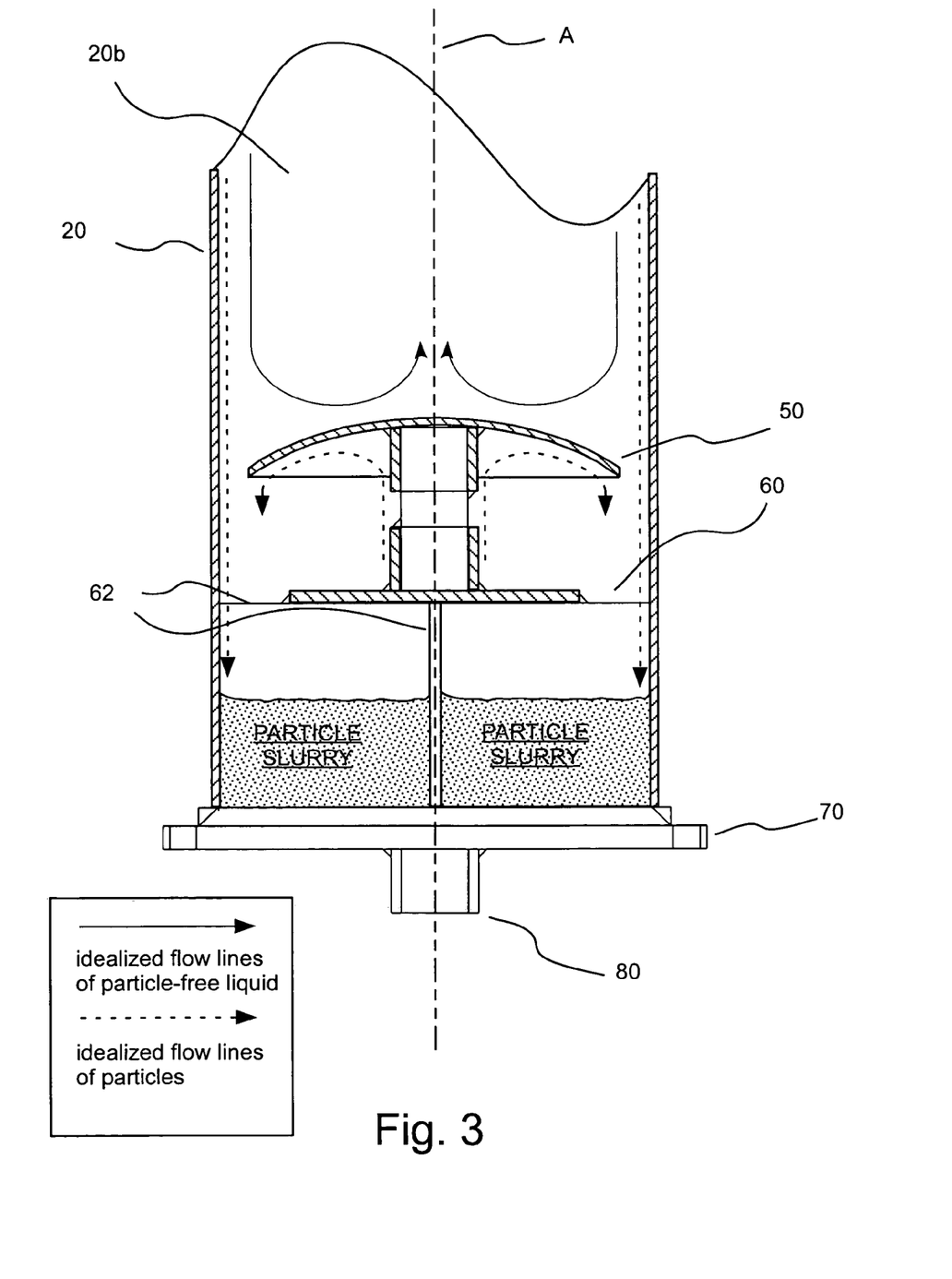
FIG. 3 illustrates a side, partially cross-sectional view of the deflector and baffle of the separation system of FIG. 1 with a representation of idealized flow lines within the separation chamber.

FIGS. 1 through 3 illustrate an embodiment of a separation system 10 that is particularly useful in separating metal particles from coolant liquid used in machining processes, but the separation systems of the present invention can be used in many other separations. In separation system 10 of FIGS. 1 through 3, "dirty" coolant liquid (that is, liquid including metal particles) enters an upper section 20a of a chamber housing 20 through an inlet 30 at a generally tangential angle with respect to generally cylindrical housing 20 and under pressure to begin a circular motion in the direction of the rotation of an impeller 40, which is positioned below inlet 30 (see FIG. 2). As used herein, the term "impeller" refers generally to any mechanism that imparts a rotational or circular flow to fluid within housing 20. Impeller 40 rotates at a speed determined by the application. To optimize performance, the speed can be adjusted for different particle size and density using, for example, a adjustable frequency drive. The speed of impeller 40 in several experimental studies of the present invention was varied between 1000 rpm and 2500 rpm. Rotation of impeller 40 causes the fluid to rotate or spin. In the embodiment of FIGS. 1 through 3, vanes 42 of impeller 40 and a lower, solid plate, which is in rotational connection with impeller 40, extend to a diameter slightly less than the inner diameter of chamber 40. A gap 46 is formed between plate 48 and the interior wall of chamber 20. A gap of the same width is formed between vanes 42 and chamber 20.

The fluid within housing 20 is under pressure and is forced to flow between the outside edges of lower plate 48 (which thus acts as a flow restrictor) and the interior wall of chamber housing 20. In other words, the particulate containing liquid must pass down the interior wall of the filter housing 20 past rotating impeller 40 and through gap 46, which is preferably relatively narrow compared to the diameter of impeller 40. In a test device used in studies of the present invention, impeller vanes 42 and lower plate 48 were operably connected and had a diameter of approximately 8.5 inches. Gap 46 was approximately 0.125 inches (⅛ inch) in width in this embodiment. However, the gap width can be varied depending, for example, on the flow rate, the size of the impeller and speed of impeller 40. The rotation of impeller 40 forces the relatively dense particles to the interior walls of chamber 40.

The inlet pressure is preferably sufficient to overcome any resistance in the system. In several studies of the systems of the present invention, the inlet pressure was at least 20 psi. Any change that increases resistance to flow (for example, an increase in liquid viscosity, an increase in impeller speed, a reduction in the width of gap 46 or an increase in the length of gap 46) would require an increase of inlet pressure. The inlet flow is an important parameter in determining the width of gap 46. The total open area of gap 46 must accommodate the required liquid flow through the device. In that regard, the greater the flow rate, the greater the area required to maintain a generally laminar flow. Although, the width of gap 46 can be increased to provide an increase in flow area, filtration efficiency can suffer.

As discussed above, the width of gap 46 controls the velocity of the liquid down the interior wall of housing 20. For example, a width of 0.125 inches for gap 46 and an interior wall diameter of 8.5 inches for housing 20 provide approximately 3.33 square inches of area through which the liquid/particles can pass. For a flow rate of 30 gallons: 30 gallons/minute×231 cubic inches/gallon=6930 cubic inches of liquid pass through gap 46 per minute. This results in a speed of 173 feet/minute or approximately 2.9 feet/second. In the case of filtering metal cutting particles from a liquid coolant, for example, a flow speed in the range of approximately 100 to 200 feet per minute can result in optimal performance. Such metal cuttings can have a density of approximately 4 gram/cubic centimeter. The optimal liquid speed through gap 46, the speed of rotation of impeller 40 and the diameter of housing 20 are also determined, in part, by the density of the particles that are being removed. If tungsten, having a density of 19 grams per cubic centimeter, is the particle to be removed, a slower speed will suffice to remove the same size particles. If the fluid in question can contain different contaminants at different times, the speed can be adjusted for optimum efficiency. Such adjustment are well within the ordinary skill of one in the art.

Although the flow restrictor plate 48 and impeller vanes 42 are operably connected and rotate together in the embodiment of FIGS. 1 through 3, they can be separated. In that regard, impeller vanes 42 and/or another mechanism of imparting rotational flow can be positioned above flow restrictor plate 48. Flow restrictor plate 48 can be stationary or rotate. Moreover, vanes 42 can have a diameter equal to, less than or greater to the diameter of flow restriction plate 48. Providing vanes 42 having the same diameter as flow restrictor plate 48 and in adjacent rotating connection with flow restrictor plate 48 may assist in developing an ordered, generally laminar flow through gap 46. Increasing the thickness of flow restrictor plate 48 and thereby the length of gap 46, can also act to order the flow through gap 46, but provides increased resistance to flow.

As the fluid passes through gap 46 and enters a lower section 20b of chamber housing 20, it continues to spin, and the centrifugal force causes more and smaller particles to migrate to the interior wall of chamber housing 20. The more the liquid spins, the more the particles move radially outward to the interior wall of chamber housing 20.

Upper section 20a and lower section 20b of chamber 20 are divided by flow restrictor plate 48, which, in the embodiment of FIGS. 1 through 3, is attached to the lower edge of vanes 42 of impeller 40. Preferably, flow patterns in lower section 20b minimize or prevent flow of particles radially inward toward, the centerline or axis A of chamber 20 (see, for example, FIG. 3). In that regard, unlike many centrifugal separation systems, lower section 20b (in which both an outlet for "clean liquid" and an outlet for the heavy fraction/particles are positioned) does not include a rotational flow mechanism for inducing rotational flow (for example, a rotor or impeller) which can result in complicated, turbulent and/or chaotic flow patterns leading to flow of some particles radially inward. Vanes 42 of impeller 40 are separated from lower chamber section 20b by flow restriction plate 48. Likewise, the shape of the inner wall of lower chamber 20b is generally cylindrical, whereas many currently available centrifugal/cyclone separation systems include a conical or frustoconical region which terminates in a lower outlet for a heavier fraction. A conical or frustoconical region, wherein radius decreases as fluid travels downward, can lead to undesirable radial inward and upward flow of particles/heavier fraction.

In currently available separation systems based at least in part on centrifugal forces, the inertia imparted to the heavy fraction or pressure changes within the system are typically the only method of separation. In separation system 10 of the present invention, flow restriction plate 48 is solid and does not allow the passage of liquid/particles. Because the liquid/particles must pass through and only through gap 46 (between flow restriction plate 48 and the interior wall of housing 20), the particles are mechanically forced to the interior wall of housing 20 while flowing in a generally circular pattern or spiraling downward pattern. Efficiency of separation is thereby increased as compared to currently available systems. Relatively efficient separations can be achieved using chamber housings of relatively short length in the separation systems of the present invention.

The inertia of the particles causes the particles to continue down the sides of the chamber housing 20 past a deflector 50. Rotation of particles about the interior wall of chamber housing 20 is reduced or preferably stopped via a mechanical stop mechanism or baffle 60 positioned below deflector 50. A sludge including a high concentration of particles collects (see, for example, FIG. 3) in sludge settling baffle 60, which is positioned adjacent a bottom sealing plate 70 of chamber housing 20. In the embodiment of FIGS. 1 through 3, baffle 60 includes stationary, crossing vanes 52 which stop the rotation of the flow about the interior wall of chamber housing 20. In one embodiment, at a programmable interval a solenoid valve 90 in fluid connection with an outlet 80 at the bottom of the separation system 10 opened for a programmable length of time. The interval and open time of solenoid valve 90 can, for example, be controlled by a programmable logic controller (PLC) or other type of computer. As the liquid within housing 20 was under pressure, the collected particles and some liquid flowed out of chamber housing 20 through outlet 80 and through valve 90 as a slurry upon opening of valve 90. The slurry can flow to an inlet 210 of a sludge separator system 200 as further described below in connection with FIG. 4.

As the liquid travels downward within lower section 20b, the liquid reaches deflector 50 and is caused generally to flow up and to the center or axis A of chamber housing 20 by the pressurized flow within chamber housing 20. Relatively particle-free liquid exits chamber housing 20, through an outlet 100 in fluid connection with a passage 112 in the hollow impeller shaft 110 in operative connection with a motor 140 (see FIG. 1) about which impeller vanes 42 rotate. In general, the direction of flow of the relatively dense particles is not reversed and continues downward to baffle 60 as described above. Deflector 50 has a diameter smaller than the inner diameter of lower chamber 20b and does not substantially effect the flow of particles along the interior wall of chamber housing 20. An idealized flow path illustrating the separation is represented by arrows in FIGS. 2A and 3. Liquid inward from the interior wall of housing 20 (the flow of which is represented by solid lines in FIGS. 2A and 3), which is relatively free of particles, flows to the centerline or axis A (see FIG. 3) of chamber housing 10 and passes upward through the passage 112 (see FIG. 2A) in the impeller shaft 110, into a clean liquid cavity 120 in fluid connection with passage 112 and out of separation system 10 through an outlet 130 in fluid connection with clean liquid cavity 120.

Absent deflector 50, the flow of liquid within chamber housing 20 can undesirably cause particles to flow radially inward and upward to outlet 130. In that regard, at an inlet flow rate of particle-laden fluid of approximately 30 gallons/minute, a downward flow rate of approximately 2.9 feet/sec can result through gap 46 having a width of 0.125 inches as described above. Complicated, non-laminar flow in lower section 20b of chamber housing 20, which can occur with such relatively high flow rates and can lead to undesirable radially inward and/or upward flow of particles, is preferably reduce or avoided. Deflector 50 assists in ensuring that relatively particle-free liquid flow inward and upward to outlet 130 while preventing particles from flow upward from baffle 60. As illustrated, for example, in FIG. 3 a curved or concave deflector having its center or focus oriented downward (toward outlet 80) was found to operate well in separation system 10. Any upward flow of particles from collecting baffle 60 was deflected downward (as represented by the dashed lines of FIG. 3) back into collecting baffle 60, while essentially particle-free liquid flow was oriented toward axis A of chamber housing 20 and to outlet 130.

Indeed, in several studies of the operation of separation system 10 using sand (which has a density similar to aluminum) as particles in a coolant liquid, a separation of approximately 98.75% of particles having a diameter of 2 μm or greater from the coolant liquid was achieved. In these studies, impeller 40 had a diameter of 8.5 inches and a chamber housing 20 had a diameter of 8.75 inches, resulting in a gap 46 of approximately 0.125 inches. Particle-laden coolant liquid was fed to inlet 30 at a flow rate of approximately 30 gallons/minute. The rotational speed of impeller 40 was varied between 1000 rpm and 2500 rpm. Housing 20 in these studies was approximately 3 feet in length.

Figure 4:
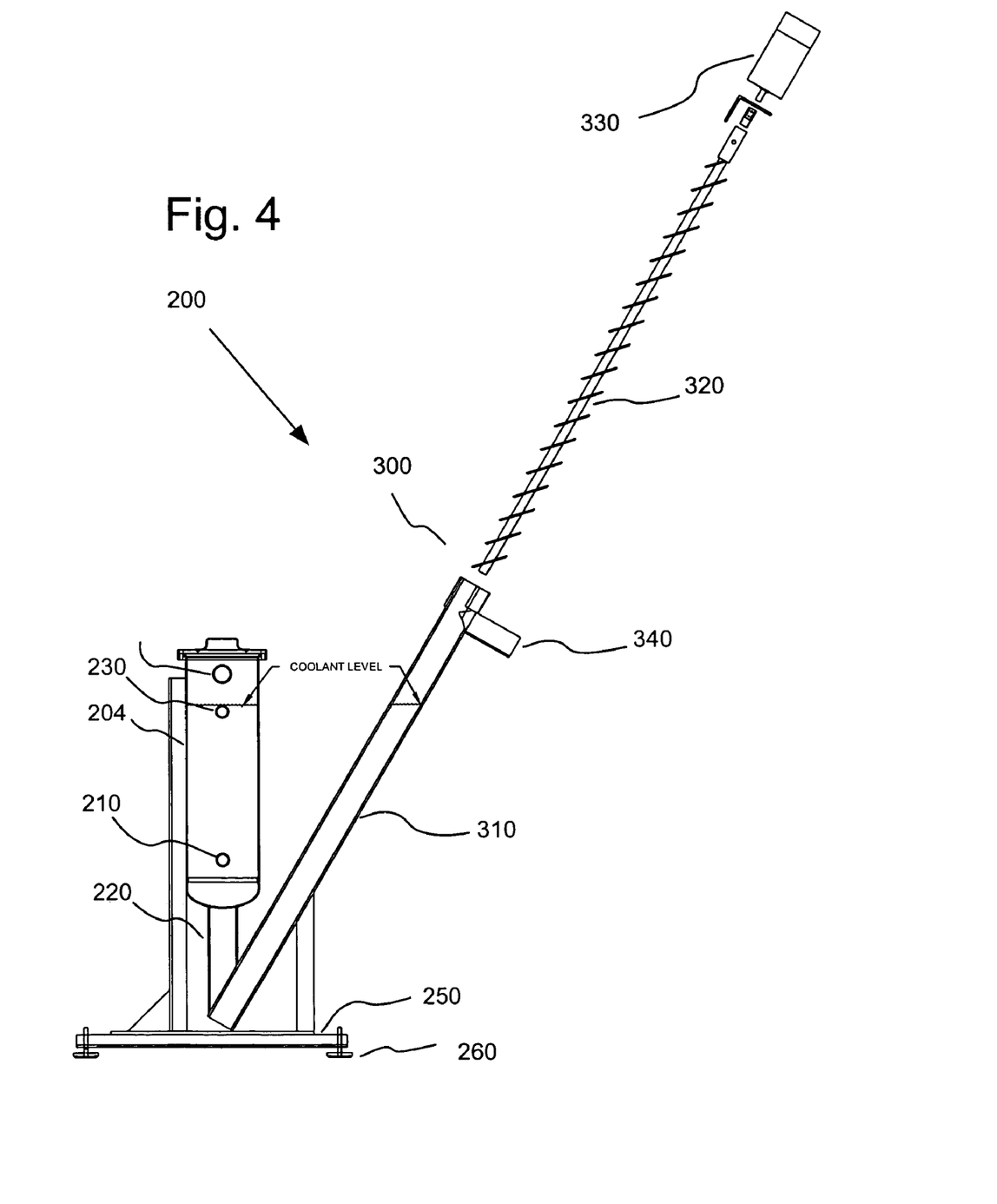
FIG. 4 illustrates an embodiment of separation system of the present invention which can operate in series with the separation system of FIG. 1 including a settling tank and a mechanical auger system for transporting particles exiting the settling tank.

The particle-rich slurry exiting outlet 90 from particle settling/collecting baffle 60 can be transported (for example, pumped) to a separating system 200 illustrated in FIG. 4 in which it enters an inlet 210 of decanting tank or settling chamber 204. Over a period of time, all of the particles settle out of the slurry. The particles fall into a settling tube 220 in fluid connection with a housing 310 of a transport system 300. The particles are removed by a mechanical transport such as an auger 320 or an elevator positioned within auger housing 310. Auger 31 is driven by a motor 330. In FIG. 4, auger system 300 is illustrated in an exploded view with auger 320 removed from auger housing 310.

Solenoid valve 90 of separation system 10 (see FIG. 1) can, for example, be opened only long enough to displace the clean decanted liquid from settling tank 204 through an outlet 230 in settling tank 204 positioned above inlet 210 thereof. The clean decanted liquid can be transported to a holding tank (not shown) from which it can be reused. The slurry is then allowed to decant (settle) for a period of time (readily calculable given a liquid and particles of known densities) long enough to let the particles collect at the bottom of settling area or tube 220 in fluid, operative connection with the bottom of settling tank 204. Auger 320 transports the particles upward in auger housing 310, and the particles fall down into, for example, a hopper once the particles reach a collection point, chute or outlet 340. Chip chute or outlet 340 can be higher than the level of fluid within settling tank 204 (that is, higher than the outlet 230) so that particles are removed with minimal liquid. Each cycle can, for example, be started with auger 320 removing settled particles. Slurry is then pumped into settling tank 204 from chamber housing 20 to displace clean coolant liquid (via outlet 230 of the settling tank 204). The mixture in settling tank 204 is then allowed to decant for as long as required, before beginning the process again.

In the embodiment of FIG. 4, settling tank 204 includes an overflow outlet 240 positioned above outlet 230 to prevent overfilling thereof. Settling tank 204 and auger housing 310 of separation system 200 are in operative connection with a base 250 including leveling feet 260 to level separation system 200 to provide optimal performance.

Although the present invention has been described in detail in connection with the above embodiments and/or examples, it should be understood that such detail is illustrative and not restrictive, and that those skilled in the art can make variations without departing from the invention. The scope of the invention is indicated by the following claims rather than by the foregoing description. All changes and variations that come within the meaning and range of equivalency of the claims are to be embraced within their scope.

What is claimed is:

1. A system for separating a heavy fraction from a liquid, comprising:

a housing, a mechanism in operative connection with the housing to induce rotational flow within an upper section of the housing, a flow restrictor positioned below the upper section of the housing, the flow restrictor having a diameter less than the inner diameter of the housing so that a gap is formed between the flow restrictor and the housing, the flow restrictor causing liquid including the heavy fraction passing from the upper section to below the flow restrictor to pass through the gap, the housing further comprising an inlet positioned above the flow restrictor through which liquid including the heavy fraction enters the housing into the upper section and a first outlet positioned below the flow restrictor through which liquid having a reduced heavy fraction exits the housing, the first outlet being positioned radially inward from an interior wall of the housing, the housing being generally cylindrical from the top of the gap to a baffle positioned below the flow restrictor, the baffle defining a settling section for the heavier fraction, the housing further comprising a second outlet in operative communication with the settling section, wherein there is no mechanism to induce rotational flow in the housing below the flow restrictor.

2. The system of claim 1 further comprising a deflector positioned above the baffle and below the flow restrictor, the deflector having a diameter less than the diameter of the housing.

3. The system of claim 1 wherein the rotational flow mechanism is an impeller comprising radially extending vanes in operative connection with a rotating shaft, the shaft having a passage therethrough in fluid connection with the first outlet.

4. The system of claim 3 wherein the flow restrictor is a plate positioned below and rotating with the vanes of the impeller.

5. The system of claim 1 wherein the baffle includes stationary vanes that extend radially outward generally to the inner diameter of the housing.

6. The system of claim 1 wherein the deflector operates to prevent at least a portion of the heavier fraction in the settling area from passing from the settling section to the first outlet.

7. The system of claim 1 wherein the deflector operates to prevent at least a portion of liquid having a reduced concentration of heavy fraction from passing from a section of the housing radially inward from the interior wall of the housing into the settling section.

8. The system of claim 1 wherein the deflector has a generally concave shape and wherein the concave deflector is oriented so that the center of the concave deflector is downward from a concave surface of the concave deflector.

9. The system of claim 1 wherein flow into the inlet is under sufficient pressure to overcome any reistance in the system.

10. The system of claim 1 wherein the heavier fraction comprises solid particles.

11. The system of claim 10 further comprising a settling tank, the settling tank including an inlet through which a particle rich slurry exiting the second outlet of the housing is transported.

12. The system of claim 11 wherein the settling tank includes a settling tank outlet positioned below the settling tank inlet, the settling tank outlet being in fluid connection with a transport to transport particles removed from the settling tank via the settling tank outlet.

13. The system of claim 12 wherein slurry from the housing is passed into the settling tank via the settling tank inlet thereby displacing liquid from the settling tank via the settling tank outlet, the transport being operable to move particles upward to a collection point, the collection point being above the level of liquid in the settling tank.

14. The system of claim 13 wherein the transport comprises an auger within an auger housing.

15. The system of claim 14 further comprising a deflector positioned above the baffle and below the inlet, the deflector having a diameter less than the diameter of the housing.

16. The system of claim 14 wherein the rotational flow mechanism is an impeller comprising radially extending vanes in operative connection with a rotating shaft, the shaft having a passage therethrough in fluid connection with the first outlet.

17. The system of claim 16 wherein the flow restrictor is a plate below and rotating with the vanes of the impeller.

18. The system of claim 17 wherein the impeller is in operative connection with a rotating shaft, the shaft having a passage therethrough in fluid connection with the first outlet.

19. A system for separating a heavier fraction from a liquid, comprising:
a housing;
a rotational flow mechanism in operative connection with a section of the housing to induce rotational flow within the housing,
a flow restrictor positioned below the section of the housing wherein rotational flow mechanism induces rotational flow, the flow restrictor having a diameter less than the inner diameter of the housing so that a gap is formed between the flow restrictor and the housing, the flow restrictor causing liquid including the heavier fraction passing from the section of the housing wherein rotational flow mechanism induces rotational flow to below the flow restrictor to pass through the gap, the housing comprising an inlet positioned above the flow restrictor so that liquid including the heavier fraction is introduced into the section of the housing wherein rotational flow mechanism induces rotational flow and a first outlet positioned below flow restrictor through which liquid having a reduced heavier fraction exits the housing, the first outlet being positioned radially inward from an interior wall of the housing;
at least one baffle positioned adjacent a bottom of the housing to reduce rotation in flow within the housing in the area of the baffle, the baffle defining a settling section for the heavier fraction, and
the housing further comprising a second outlet positioned adjacent the bottom of the housing in fluid communication with the settling section,
wherein the housing is generally cylindrical from the top of the gap to the baffle and there is no mechanism to induce rotational flow in the housing below the flow restrictor.

20. The system of claim 19 wherein the baffle includes stationary vanes that extend radially outward generally to the inner diameter of the housing.

21. The system of claim 19 wherein flow into the inlet is under sufficient pressure to overcome any resistance in the system.

22. The system of claim 19 wherein the deflector operates to prevent at least a portion of the heavier fraction in the settling area from passing from the settling section to the first outlet.

23. The system of claim 19 wherein the deflector operates to prevent at least a portion of liquid having a reduced concentration of heavy fraction from passing from a section of the housing radially inward from the interior wall of the housing into the settling section.

24. The system of claim 19 wherein the deflector has a generally concave shape and wherein the concave deflector is oriented so that the center of the concave deflector is downward from a concave surface of the concave deflector.

25. The system of claim 19 wherein the heavier fraction comprises solid particles.

26. The system of claim 25 further comprising a settling tank, the settling tank including an inlet through which a particle rich slurry exiting the second outlet of the housing is transported.

27. The system of claim 26 wherein the settling tank includes a settling tank outlet positioned below the settling tank inlet, the settling tank outlet being in fluid connection with a transport to transport particles removed from the settling tank via the settling tank outlet.

28. The system of claim 27 wherein slurry from the housing is passed into the settling tank via the settling tank inlet thereby displacing liquid from the settling tank via the settling tank outlet, the transport being operable to move particles upward to a collection point, the collection point being above the level of liquid in the settling tank.

29. The system of claim 27 wherein the transport comprises an auger within an auger housing.

30. A method of separating solid particles from a liquid; comprising:
introducing liquid containing particles into an upper section of a separation system, the separation system comprising a housing;
inducing rotational flow of the liquid containing particles in the upper section of the housing;
forcing the liquid containing particles past a flow restrictor to a lower section of the housing, the flow restrictor having a diameter less than an interior wall of the housing so that a gap is formed between the flow restrictor and the interior wall of the housing through which the liquid containing particles must pass and so that the liquid containing particles moves around and downward along the interior wall of the housing, thereby forcing particles to move radially outward toward the interior wall of the housing as a result of centrifugal force, wherein the housing is generally cylindrical below the flow restrictor and there is no mechanism to induce rotational flow in the housing below the flow restrictor.

31. The method of claim 30 further comprising:
positioning a deflector below the gap, the deflector being dimensioned to form a gap between the deflector and the interior wall of the housing;
reducing rotation of the flow in a settling section positioned within the housing below the deflector;
removing liquid having a reduced concentration of particles from a first outlet positioned radially inward from the interior wall of the housing and above the deflector; and
removing liquid having an increased concentration of particles from a second outlet in operative connection with the settling section.

32. The method of claim 31 wherein the housing is generally cylindrical from at least the position of the top of the gap to a baffle positioned below the flow restrictor to define the settling section.

33. The method of claim 32 further comprising:
transporting outflow from the second outlet to a settling tank, the settling tank including an inlet through which outflow from the second outlet enters the settling tank;
allowing the contents of the settling tank to settle for a period of time; and
removing liquid having a reduced concentration of particles from a settling tank outlet positioned above the settling tank inlet.

34. The method of claim 33 wherein the settling tank outlet is in fluid connection with a transport.

35. The method of claim 34 wherein outflow from the housing is passed into the settling tank via the settling tank inlet thereby displacing liquid from the settling tank via the settling tank outlet, the transport being operable to move particles upward to a collection point, the collection point being above the level of liquid in the settling tank.

36. The method of claim 35 wherein the mechanical transport comprises an auger within an auger housing.

37. A system for separating a heavier fraction from a liquid, comprising:
a housing;
a rotational flow mechanism in operative connection with a first section of the housing to induce rotational flow within the housing, a flow restrictor positioned below the first section of the housing wherein rotational flow mechanism induces rotational flow, the flow restrictor having a diameter less than the inner diameter of the housing so that a gap is formed between the flow restrictor and the housing, the flow restrictor causing liquid including the heavier fraction passing from the first section to below the flow restrictor to pass through the gap, the housing comprising an inlet positioned above the flow restrictor so that liquid including the heavier fraction is introduced into the first section of the housing and a first outlet positioned below flow restrictor through which liquid having a reduced heavier fraction exits the housing the first outlet being positioned radially inward from an interior wall of the housing;
a collection section adjacent the bottom of the housing for the heavier fraction, and
the housing further comprising a second outlet positioned adjacent the bottom of the housing in fluid communication with the collection section,
wherein the housing is generally cylindrical from the top of the gap to the collection section and there is no mechanism to induce rotational flow in the housing below the flow restrictor.

* * * * *